UNITED STATES PATENT OFFICE.

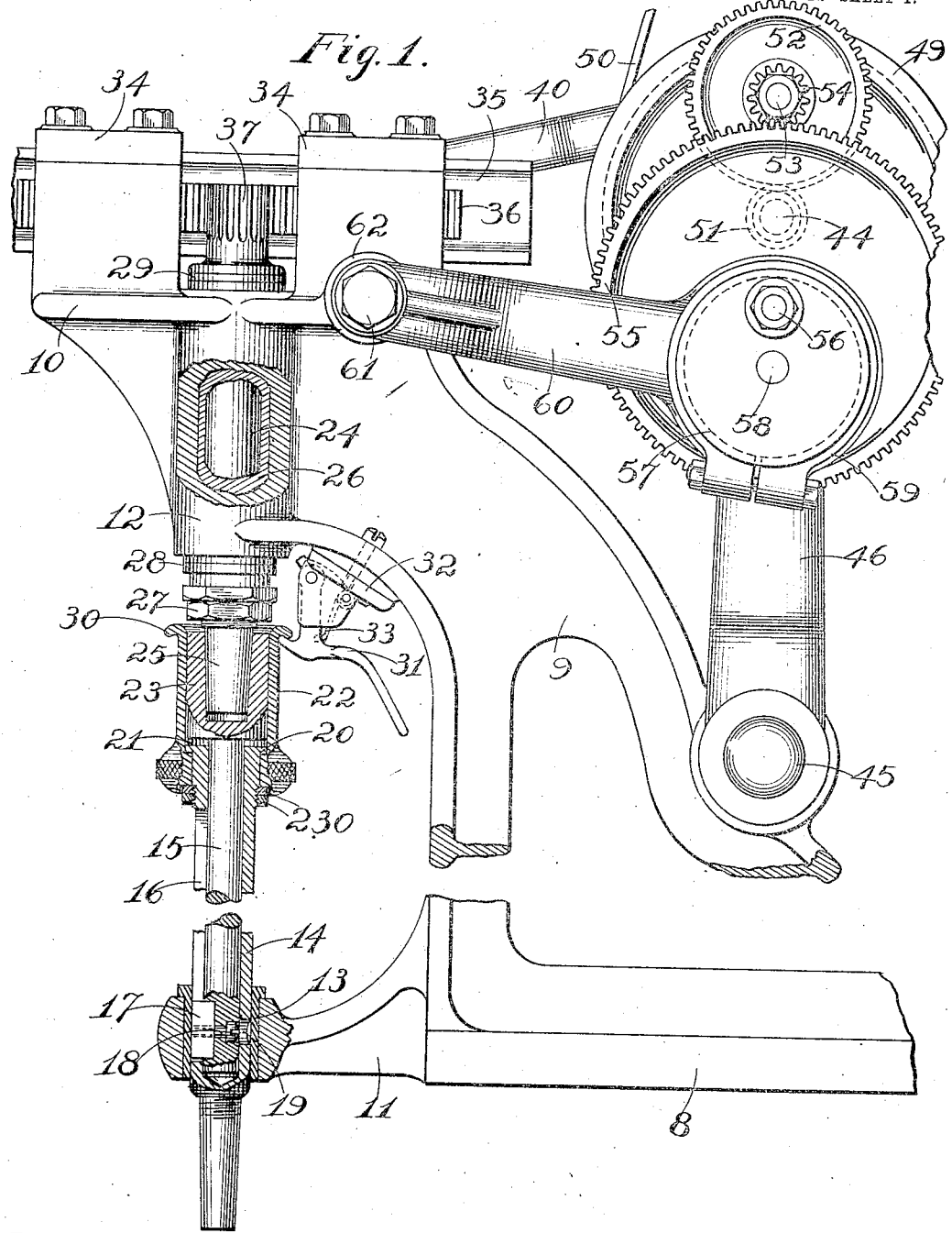

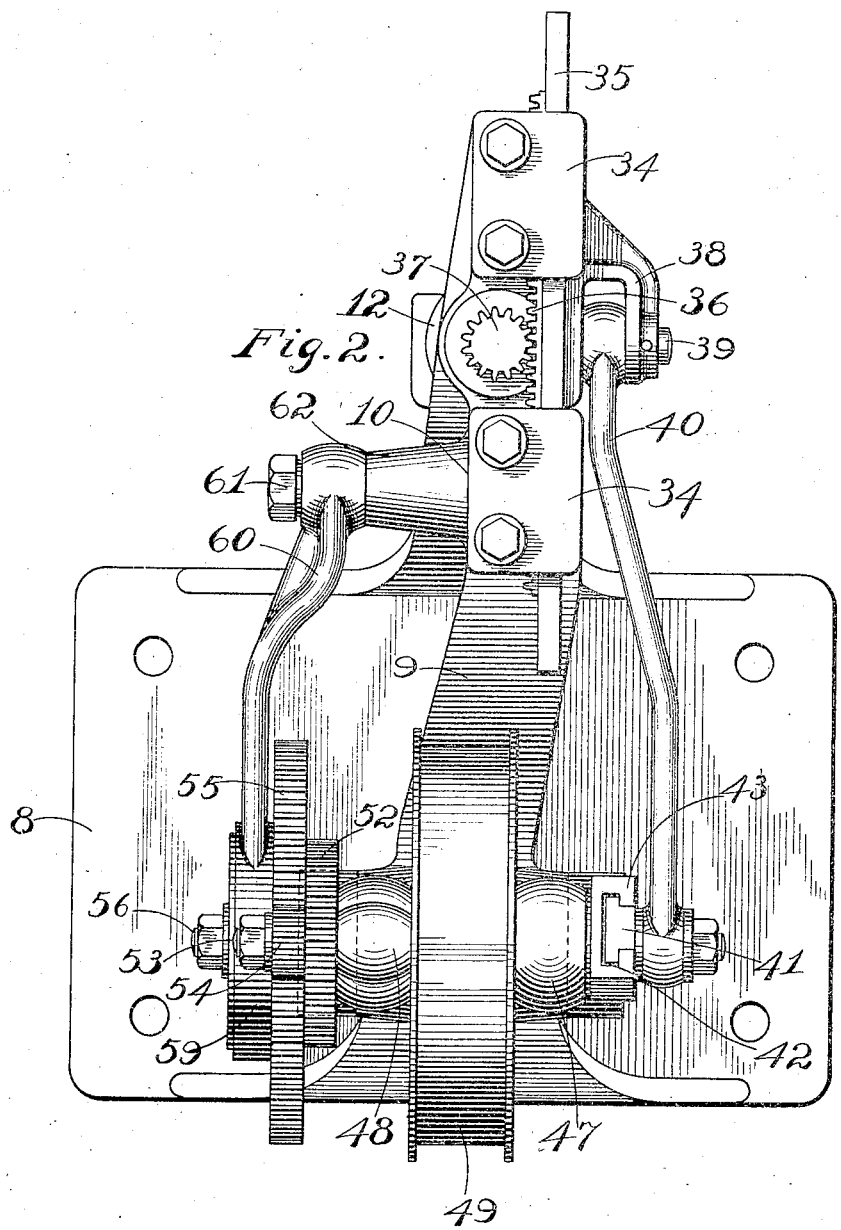

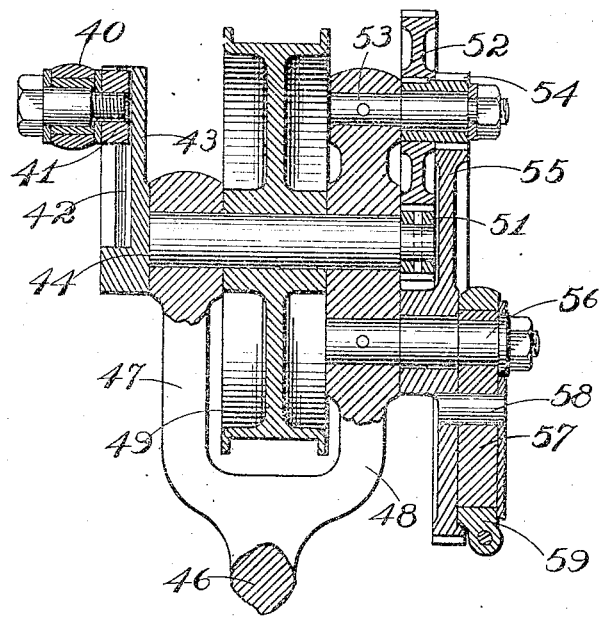
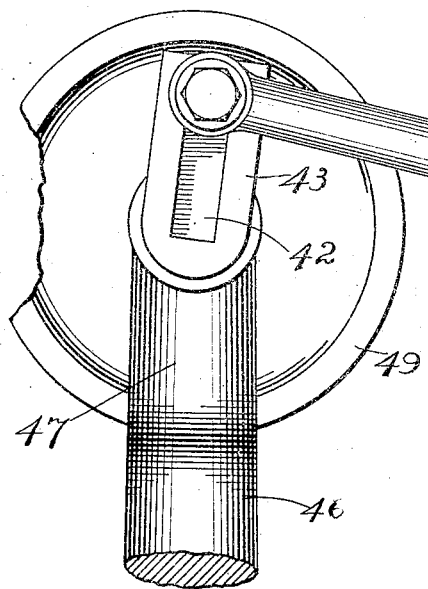
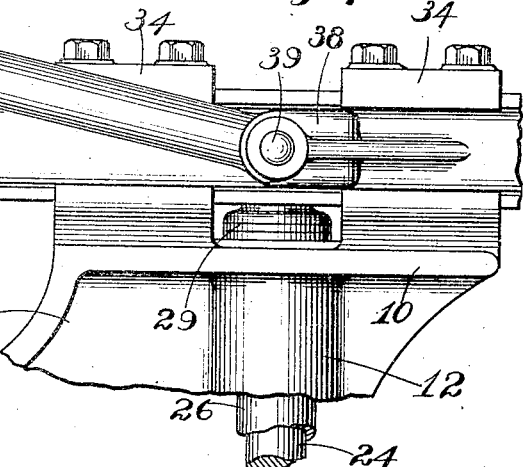

FRANK W. COOKE, OF HARTFORD, CONNECTICUT, ASSIGNOR TO THE POPE MANUFACTURING COMPANY, OF HARTFORD, CONNECTICUT, A CORPORATION OF CONNECTICUT.

MACHINE FOR GRINDING VALVE-CAGE SEATS.

950,565.  Specification of Letters Patent.  Patented Mar. 1, 1910.

Application filed June 17, 1907. Serial No. 379,486.

*To all whom it may concern:*

Be it known that I, FRANK W. COOKE, of Hartford, in the county of Hartford and State of Connecticut, have invented a new and Improved Machine for Grinding Valve-Cage Seats and the Like, of which the following is a specification.

My invention relates to the class of machines used for forming the seat of the valve cage, valve, or the like, and the object of my invention is to provide a machine of this class in the use of which a seat may be accurately formed.

A further object of the invention is to provide a machine by the use of which the operation of forming a seat may be quickly accomplished.

A further object of the invention is to provide a machine of this class extremely simple in construction and operation.

A form of machine in the use of which the above objects may be attained is shown in the accompanying drawings in which—

Figure 1 is a view in side elevation of a portion of the machine embodying my invention with parts broken away to show construction. Fig. 2 is a top or plan view of the machine. Fig. 3 is a view in horizontal section on a plane passing through the driving shaft, looking rearward. Fig. 4 is a detail view showing the rocker-arm and connected parts, and looking in the opposite direction from the point of view of Fig. 1, and with parts beyond the pulley omitted.

In the accompanying drawings the numeral 8 denotes a base that may be supported by a bed or table not shown. A neck 9 rises from the base on the upper end of which is located a head 10. A spindle support 11 projects from the base and the head 10 has a cylindrical enlargement 12 forming a bearing for the upper part of the spindle. A bushing 13 is located in an opening in the spindle support 11.

The spindle entire includes a number of parts, a tool spindle and a sectional main spindle. The tool spindle 14 is partially mounted in the bushing 13 on the support 11 and its lower end is provided with any suitable means of attachment for the grinding devices or holder for parts to be ground. The tool spindle has a central opening extending into its upper end in which opening the lower section 15 of the main spindle is located. A slot 16 is formed through the wall of the tool spindle and a spline 17 secured to the section 15 of the main spindle is located in this slot. A screw 18 projecting through the section 15 secures the spline in position, thus causing the tool spindle 14 and the spindle section 15 to rotate together while allowing a lengthwise movement of one of the parts with respect to the other. A hand sleeve 22 is secured to the upper end of the spindle 14, by the flange 20, projecting into the recess 21, and nuts 230, one of which may be a lock nut, located underneath the sleeve 22, these nuts holding the spindle 14 and hand sleeve 22 in relative position and allowing rotation of the spindle 14 independently of the hand sleeve 22.

The upper end of the lower spindle section 15 has an enlargement 23 which may also enter the recess 21 when the tool spindle 14 is in its raised position. The upper section 24 of the main spindle is rigidly connected to the lower section 15, in the form shown a tapered end 25 on the one part entering a tapered socket in the enlargement 23. A bushing 26 forms the immediate bearing for the section 24 of the spindle in the enlargement or spindle bearing 12 on the head of the machine frame. Nuts 27 and anti-friction washers 28 located underneath the bearing 12, and like washers 29 together with a pinion 37 located at the upper end thereof form means for limiting the lengthwise movement of the spindle, while permitting free rotary movement thereof.

A lip 30 is formed on the upper edge of the hand sleeve 22 and a latch 31 engages the under side of this lip to hold the hand sleeve 22 and the tool spindle 14 at the upper limit of their play. This latch is mounted on a latch base 32 secured to the neck 9 and a spring 33 may be employed for holding the latch normally in position to engage the lip 30.

Plates 34 are secured to the upper edge of the head 10, these plates forming in part a guide-way for a slide 35, the head 10 being properly formed to constitute the remainder of the guide-way. The slide 35 bears a rack 36 which meshes with a pinion 37 secured to or forming an integral part of the upper end of the section 24 of the main spindle. The slide 35 has a projection 38 integrally formed therewith in which is mounted one end of a pin 39, the opposite end of the pin being mounted in the main part of the slide.

A driving rod 40 is pivoted upon the pin 39, the opposite end of this rod being pivotally connected to a clamp 41 located in a T-shaped slot 42 in a crank 43 secured to the main shaft 44 of the machine.

A rock shaft 45 is mounted at the back of the neck 9 and a rocking arm 46 is supported by said shaft. The upper end of the arm 46 is forked having branches 47, 48, and the shaft 44 is mounted in said branches, as clearly shown in Fig. 3 of the drawings. A driving pulley 49 is secured to the main shaft 44 and may be driven from any suitable source of power, as by means of a belt 50.

The shaft 44 bears a pinion 51 in mesh with a gear 52 mounted upon the hub of a pinion 54 which in turn is mounted upon a stud 53 secured to the branch 48 of the fork. The pinion 54 meshes with a gear 55 mounted upon a stud 56, also secured to the branch 48. An eccentric 57 is secured to the gear 55, as by means of a pin 58, and the strap 59 of the eccentric is secured to an actuating rod 60, the end of this rod opposite the eccentric strap being pivoted to a stud 61 secured to the head 10, in the form shown a boss 62 projecting from the head affording the means for supporting the stud.

From the above description it will be seen that as the main shaft 44 is driven, as by means of power applied to the pulley 49 keyed thereto, the slide 35 will be reciprocated through the medium of the driving rod 40 and crank 43. This, through the intermeshing of the rack on the slide and the pinion 37 at the end of the spindle bearing the grinding devices, will cause the latter to be reciprocated in a circular path. The valve cage, valve, or like part to be fitted to the seat being formed is secured at the end of the spindle and a proper abrading material applied between the meeting surfaces, and by thus reciprocating said valve cage, valve or the like a ground joint with the seat is obtained.

In order to form a perfect seat it is desirable that the relative location of the valve cage, valve, or like device performing the grinding operation, and the seat being operated upon, shall be continuously changed, and in order to accomplish this the rocking arm 46 is reciprocated through the medium of the pinion 51, gear 52, pinion 54, gear 55, eccentric 57 and actuating rod 60. The pivot 61 being fixed, as the eccentric is rotated by means of the intermeshing gears above described the rocking arm 46 is swung upon its pivotal support and it is evident that the reciprocating path of the grinding device is thus constantly changed, that is, the zone of reciprocating movement of any point upon the surface of the grinding device is being constantly varied and changed so that without interrupting the grinding operation or changing the relative positions of the grinding device and the device being ground different parts of said two devices are being constantly brought into contact.

Other means for causing a rotary reciprocating movement to be given to the grinding device, and also for changing the path of this rotary reciprocating movement are contemplated by me as within the scope and intent of my invention and I do not limit myself to the exact means shown and described herein.

I claim:—

1. A machine frame, a tool spindle mounted in the frame, means for uninterruptedly imparting reciprocating rotary movement to the spindle, and means for constantly changing the zone of movement of a point on the surface of the spindle.

2. A machine frame, a tool spindle mounted in the frame, a main shaft, connections between said shaft and spindle for uninterruptedly imparting a reciprocating rotary movement to said spindle, and connections with said spindle for constantly changing the zone of movement of a point on the surface of the spindle.

3. A machine frame, a tool spindle mounted in the frame, self-actuated means for uninterruptedly imparting a reciprocating rotary movement to said spindle, and self-actuated means for constantly changing the zone of movement of a point on the surface of the spindle.

4. A machine frame, a tool spindle mounted in the frame, means for mechanically reciprocating said tool spindle in a circular path, means for mechanically changing the zone of movement of a point on the surface of the spindle, and means for applying pressure to said spindle.

5. A machine frame, a tool spindle mounted for continuous reciprocating rotary movement in the frame, a slide operatively connected with the spindle, means for mechanically reciprocating the slide, and mechanical means for constantly changing the path of said reciprocation.

6. A machine frame, a tool spindle mounted for continuous reciprocation in the frame, a pinion operatively connected with the spindle, a rack meshing with said pinion, means for mechanically reciprocating the rack, and mechanical means for constantly changing the zone of movement of a point on the surface of said rack.

7. A machine frame, a tool spindle mounted in the frame, a main shaft, operative connections between said shaft and spindle for imparting reciprocating rotary movement to the latter, and means for constantly changing the relative location of said main shaft and spindle.

8. A machine frame, a tool spindle mounted in the frame, a slide operatively connected with the spindle to impart reciprocating rotary movement thereto, a main shaft operatively connected with the slide, and means for constantly changing the relative location of the shaft and spindle.

9. A machine frame, a tool spindle mounted in the frame, a rocking arm mounted independently of said spindle, spindle actuating means operatively mounted upon said arm and operatively connected with the spindle, and means for rocking the arm.

10. A machine frame, a tool spindle mounted in the frame, a rocking arm, spindle actuating means operatively mounted upon said arm and operatively connected with the spindle to impart rotary reciprocating movement thereto, and means for rocking said arm.

11. A machine frame, a tool spindle mounted in the frame, a slide operatively connected with the spindle, a rocking arm, actuating means on said arm operatively connected with the slide, and means for rocking the arm.

12. A machine frame, a spindle mounted in the frame, a rocking arm, a main shaft mounted on and carried by said arm, operative connections between said shaft and spindle, and means for rocking the arm.

13. A machine frame, a tool spindle mounted in the frame, a slide operatively connected with the spindle, a rocking shaft, a main shaft mounted on the arm, connections between said arm and slide for operating the latter, and means for rocking said arm.

14. A machine frame, a tool spindle, a rocking arm, actuating mechanism on said arm operatively connected with said spindle, an actuating rod having one end supported on a fixed pivot and the other end connected with the rotary parts on said arm whereby the latter is rocked on its pivot.

15. A machine frame, a tool spindle mounted in the frame, a rocking arm, actuating mechanism on said arm operatively connected with said spindle, and including an eccentric, an operating rod having one end supported on a fixed pivot and the other end connected with said eccentric whereby the arm is rocked on its pivot.

16. A machine frame, a tool spindle mounted in the frame, a rocking arm, actuating mechanism on said arm, connections between said mechanism and tool spindle for reciprocating the latter in a circular path, an actuating rod with one end supported on a fixed pivot and the other connected with said arm, and connections between the end of said arm and the actuating mechanism for rocking said arm.

17. A machine frame, a tool spindle mounted in the frame, a slide operatively connected with the spindle, a rocking arm, a main shaft mounted on said arm, connections between said main shaft and slide for reciprocating the latter, an eccentric operatively connected with the main shaft, and an actuating rod connected with said eccentric and with its end mounted on a fixed pivot.

18. A machine frame, a tool spindle mounted in the frame, a slide operatively connected with said spindle, a rocking arm, a shaft bearing a crank mounted on said arm, connections between said crank and slide for reciprocating the latter, an eccentric, connections between said eccentric and main shaft, and an actuating rod connected with said eccentric and with its end supported on a fixed pivot.

19. A machine frame, a tool spindle mounted in the frame, a slide operatively connected with the spindle, a rocking arm bearing actuating mechanism including a crank operatively connected with said slide and an eccentric operatively connected with an actuating rod, and the actuating rod with one end supported on a fixed pivot.

20. A machine frame, a tool spindle mounted in the frame, a rocking arm, actuating mechanism mounted on said arm for reciprocating said spindle in a circular path, connections between said spindle and actuating mechanism, and an actuating rod with one end supported on a fixed pivot, and connections between said rod and actuating mechanism for reciprocating the arm at a comparatively slow rate of speed.

21. A machine frame, a tool spindle mounted in the frame, a rocking arm, rotating mechanism on the arm for reciprocating the spindle in a circular path, rotating mechanism for rocking said arm and traveling at a different rate of speed from that for operating the spindle, and connections with the rotating mechanism for rocking said arm.

22. A machine frame, a tool spindle mounted in the frame a rocking arm, rotating mechanism on the arm for reciprocating the spindle in a circular path, rotating mechanism for rocking said arm and traveling at a lower rate of speed than that for operating the spindle, and connections with the rotating mechanism for rocking said arm.

23. A machine frame, a tool spindle mounted in the frame, a rocking arm, operating mechanism mounted on said arm and including a rotary member for operating the rocking arm and traveling at a rate of speed different from that of the member for operating the spindle, and connections with the rotary member for operating the rocking arm for causing a reciprocation thereof.

24. A tool spindle and a main spindle connected to rotate together but having longitudinal movement one independently of the other, means for mechanically operating said spindle, and means for simultaneously manually operating the spindle.

25. A tool spindle and a main spindle connected to rotate together but having longitudinal movement one independently of the other, means for mechanically rotating said spindle, and a hand sleeve mounted on the spindle to allow independent rotation thereof.

26. A machine frame, a tool spindle mounted in the frame, means for imparting reciprocating movement to the spindle successively in circular paths of the same length, and means for constantly changing the location of said reciprocatory path.

27. A machine frame, a tool spindle mounted in the frame, means for imparting rotating reciprocating movement to the spindle, and means for constantly changing the commencement point of said reciprocating movement.

28. A machine frame, a tool spindle mounted in the frame, means for uninterruptedly imparting rotary reciprocating movement to the spindle, and means for changing the commencement point of said reciprocatory path.

29. A machine frame, a tool spindle mounted in the frame, a main shaft, connections between said shaft and spindle for uninterruptedly imparting a rotary reciprocating movement to the spindle, and connections with said shaft for changing the commencement point of said reciprocatory path.

30. A machine frame, a tool spindle mounted for continuous reciprocating rotary movement in the frame, a slide operatively connected with the spindle, means for reciprocating the slide, and self-actuated means for changing the path of said reciprocatory movement.

31. A machine frame, a tool spindle mounted in the frame, means for imparting rotary reciprocating movement to the spindle successively in paths of the same length, and means for changing the commencement point of said reciprocatory path.

32. A machine frame, a tool spindle mounted in the frame, means for uninterruptedly imparting reciprocating movement to the spindle in a rotary path, and means for constantly changing the commencement and terminating points of said reciprocating movement.

33. A machine frame, a tool spindle mounted in the frame, means for uninterruptedly imparting reciprocating rotary movement to the spindle, and means for constantly changing the point of beginning of said rotary movement.

34. A machine frame, a tool spindle mounted in the frame, a main shaft mounted to move bodily upon the frame, means for imparting bodily movement to the main shaft, and connections between said main shaft and spindle whereby the latter is reciprocated in rotary paths varying in location.

35. A machine frame, a tool spindle mounted in the frame, a rocking arm, actuating mechanism mounted on said arm, connections between said actuating mechanism and spindle for imparting rotary reciprocating movement to the spindle, and connections with said mechanism for rocking said arm.

36. A tool spindle and a main spindle connected to rotate together but having longitudinal movement one independently of the other, means for mechanically operating said spindle, and non-rotatable means mounted on the spindle for manually imparting longitudinal movement thereto.

FRANK W. COOKE.

Witnesses:
NED LAWRENCE,
H. C. SEYMOUR.